(12) United States Patent
Harada

(10) Patent No.: US 12,236,228 B2
(45) Date of Patent: Feb. 25, 2025

(54) MANAGEMENT DATA REWRITE SYSTEM AND VEHICLE INCLUDING MANAGEMENT DATA REWRITE SYSTEM

(71) Applicant: SUBARU CORPORATION, Tokyo (JP)

(72) Inventor: Masaaki Harada, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 100 days.

(21) Appl. No.: 18/113,679

(22) Filed: Feb. 24, 2023

(65) Prior Publication Data

US 2023/0289172 A1   Sep. 14, 2023

(30) Foreign Application Priority Data

Mar. 10, 2022   (JP) .................. 2022-037429

(51) Int. Cl.
   *G06F 8/65*   (2018.01)
   *G07C 5/00*   (2006.01)
   *H04L 67/12*  (2022.01)

(52) U.S. Cl.
   CPC ............... *G06F 8/65* (2013.01); *G07C 5/008* (2013.01); *H04L 67/12* (2013.01)

(58) Field of Classification Search
   CPC ..................... G06F 8/60–66; G07C 5/008
   (Continued)

(56) References Cited

U.S. PATENT DOCUMENTS

2019/0056925 A1   2/2019   Komano et al.

FOREIGN PATENT DOCUMENTS

EP   3916598 A1 * 12/2021   ........... G06F 21/554
FR   3108742 A1 * 10/2021   ............ B60W 50/02
(Continued)

OTHER PUBLICATIONS

Placho, Teresa, et al., Management of automotive software updates, Microprocessors and Microsystems, vol. 78, Oct. 2020, 9 pages, [retrieved on Jul. 29, 2024], Retrieved from the Internet: <URL:https://www.sciencedirect.com/science/article/pii/S0141933120304178>.*

(Continued)

*Primary Examiner* — Geoffrey R St Leger
(74) *Attorney, Agent, or Firm* — TROUTMAN PEPPER LOCKE LLP

(57) ABSTRACT

A management data rewrite system is provided that includes first and second electronic control units. The first electronic control unit includes a non-volatile memory configured to hold management data regarding multiple electronic control units. In the second electronic control unit, an update of in-vehicle software is made. The second electronic control unit is coupled to the first electronic control unit and configured to carry out transmission and reception of data to and from the first electronic control unit through an in-vehicle network. The second electronic control unit receives an entirety of the management data from the non-volatile memory, rewrites a data portion related to the update of the in-vehicle software in the management data, into new data, and transmits an entirety of the post-rewrite management data to the first electronic control unit, to allow the non-volatile memory to hold the entirety of the post-rewrite management data.

13 Claims, 8 Drawing Sheets

(58) Field of Classification Search
USPC .................................................. 717/168–178
See application file for complete search history.

(56) References Cited

FOREIGN PATENT DOCUMENTS

| JP | 2019-36251 A | 3/2019 | | |
|---|---|---|---|---|
| WO | WO-2022239613 A1 | * | 11/2022 | ............... G06F 8/65 |

OTHER PUBLICATIONS

Myklebust, Thor, et al., Trust Me, We Have a Safety Case for the Public, Proc of the 31th European Safety and Reliability Conference, Jan. 2021, 7 pages, [retrieved on Jul. 29, 2024], Retrieved from the Internet: <URL:https://www.researchgate.net/publication/354888536_Trust_Me_We_Have_a_Safety_Case_for_the_Public>.*

* cited by examiner

MANAGEMENT DATA REWRITE SYSTEM AND VEHICLE INCLUDING MANAGEMENT DATA REWRITE SYSTEM

CROSS-REFERENCE TO RELATED APPLICATION

The present application claims priority from Japanese Patent Application No. 2022-037429 filed on Mar. 10, 2022, the entire contents of which are hereby incorporated by reference.

BACKGROUND

The disclosure relates to a management data rewrite system configured to rewrite management data on the occasion of an update of in-vehicle software, and a vehicle including the management data rewrite system.

Recently, more and more electronic control units (ECU: Electronic Control Unit) mounted on vehicles are coupled together through in-vehicle networks such as CAN (Controller Area Network) or MOST (Media Oriented Systems Transport). In addition, in-vehicle software that operates a large number of ECUs is also increasing in number and complexity. For this reason, it is desirable for manufacturers to efficiently and safely manage in-vehicle software throughout the life cycle of vehicles.

In the management of in-vehicle software, in particular, as for licensing data under legal regulations, licensing data regarding in-vehicle software related to all ECUs to be managed in a single vehicle is managed for each legal number, with the use of an identifier RXSWIN (Rx Software Identification Number).

In existing techniques, in updating in-vehicle software, an ECU coupled to all terminal ECUs through an in-vehicle network, e.g., a CGW (Central Gateway ECU), makes an update control. In this configuration, the CGW makes a control including: receiving update data from an external server through a communication network; transmitting the received update data through the in-vehicle network to a terminal ECU to be updated; receiving post-update verification data from the terminal ECU updated; and verifying whether or not the update has been successful. For example, reference is made to Japanese Unexamined Patent Application Publication (JP-A) No. 2019-36251.

SUMMARY

An aspect of the disclosure provides a management data rewrite system including a first electronic control unit and a second electronic control unit. The first electronic control unit includes a non-volatile memory. The non-volatile memory is configured to hold management data regarding multiple electronic control units. In the second electronic control unit, an update of in-vehicle software is made. The second electronic control unit is coupled to the first electronic control unit and configured to carry out transmission and reception of data to and from the first electronic control unit through an in-vehicle network. The management data rewrite system is configured to rewrite the management data on the occasion of the update of the in-vehicle software. The second electronic control unit is configured to: receive an entirety of the management data from the non-volatile memory of the first electronic control unit; rewrite a data portion related to the update of the in-vehicle software in the management data, into new data; and transmit an entirety of the post-rewrite management data to the first electronic control unit, to allow the non-volatile memory to hold the entirety of the post-rewrite management data.

An aspect of the disclosure provides a vehicle including the management data rewrite system.

An aspect of the disclosure provides a vehicle including a management data rewrite system. The management data rewrite system includes a first electronic control unit and a second electronic control unit. The first electronic control unit includes a non-volatile memory. The non-volatile memory is configured to hold management data regarding multiple electronic control units. In the second electronic control unit, an update of in-vehicle software is made. The second electronic control unit is coupled to the first electronic control unit and configured to carry out transmission and reception of data to and from the first electronic control unit through an in-vehicle network. The management data rewrite system is configured to rewrite the management data on the occasion of the update of the in-vehicle software. The second electronic control unit is configured to: receive an entirety of the management data from the non-volatile memory of the first electronic control unit; rewrite a data portion related to the update of the in-vehicle software in the management data, into new data; and transmit an entirety of the post-rewrite management data to the first electronic control unit, to allow the non-volatile memory to hold the entirety of the post-rewrite management data.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
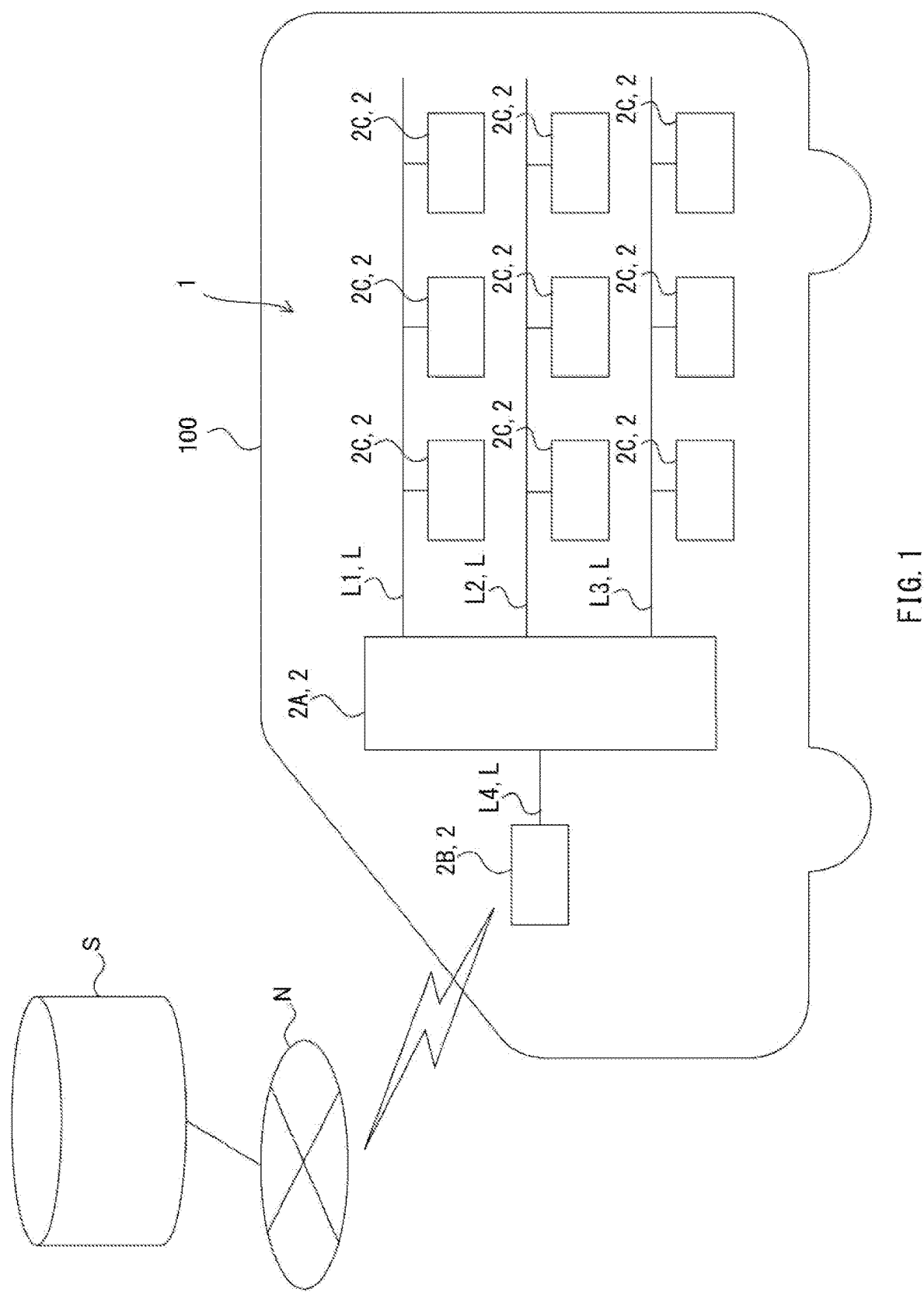
FIG. 1 is a diagram that illustrates a system configuration example of a management data rewrite system according to one embodiment of the disclosure.

Let us consider a case where RXSWIN management data is readably held in a non-volatile memory of an ECU mounted on a vehicle. In this case, an update of in-vehicle software of a specific terminal ECU necessitates rewriting the RXSWIN management data in accordance with the update of the in-vehicle software. The RXSWIN management data is held as a string of data related to multiple ECUs (SWIN: Software Identification Number) in the order of legal numbers. Accordingly, in a case where the rewrite of the management data is carried out by the CGW, the CGW has to find the legal number related to the ECU in which the software is updated, from the management data, and carry out processing of rewriting the data. This results in complicated processing.

Sometimes, a new legal number is obtained, e.g., in a case where an extension is added to the legal number on the occasion of the update of the in-vehicle software. In such a case, because the CGW does not have data regarding how the pre-update management data regarding the in-vehicle software has been changed after the update, the CGW is not able to find which data to rewrite, from the pre-rewrite RXSWIN management data. Thus, in such a case, it is difficult to deal with the rewrite of the RXSWIN management data by the single process by the CGW.

It is desirable to provide a management data rewrite system and a vehicle including the management data rewrite system that make it possible to carry out rewrite processing of management data related to multiple ECUs in accompaniment with an update of in-vehicle software, and smoothly rewrite data related to the update, without involving complicated processing.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

As illustrated in FIG. 1, a management data rewrite system 1 may be mounted on a vehicle 100. The management data rewrite system 1 may include various ECUs 2. The ECUs 2 are coupled together through communication lines L1 to L4, and configured to transmit and receive data. The communication lines L1 to L4 constitute an in-vehicle network L. The communication lines L1 to L4 of the in-vehicle network L may be, for example, a communication bus of a CAN system, i.e., a CAN bus. However, the communication lines L1 to L4 are not limited thereto, but may be communication lines of other systems.

The ECUs 2 may include a first ECU 2A and a second ECU 2B. The first ECU 2A is, for example, a gateway unit, e.g., a CGW. The first ECU 2A is coupled to terminal ECUs 2C through the communication lines L1 to L4 and serves as a relay of the communication lines L1 to L4. The second ECU 2B is, for example, a data communication module (DCM) configured to establish wireless communication with an external network N to which an external server S is coupled.

The communication lines L1 to L3 are separately coupled to the first ECU 2A. The communication lines L1 to L3 constitute local area networks (LANs) of separate communication routes. The LANs may include, for example, a travel control LAN, a body LAN, and a multimedia LAN. The travel control LAN makes, for example, a vehicle behavior stabilization control, an engine control, or an air conditioner control. The body LAN controls, for example, door locks, seat operation, or power windows. The multimedia LAN controls, for example, audio devices or navigation systems. One or more of the terminal ECUs 2C are coupled to each of the communication lines L1 to L3, to operate for each communication route.

Figure 2:
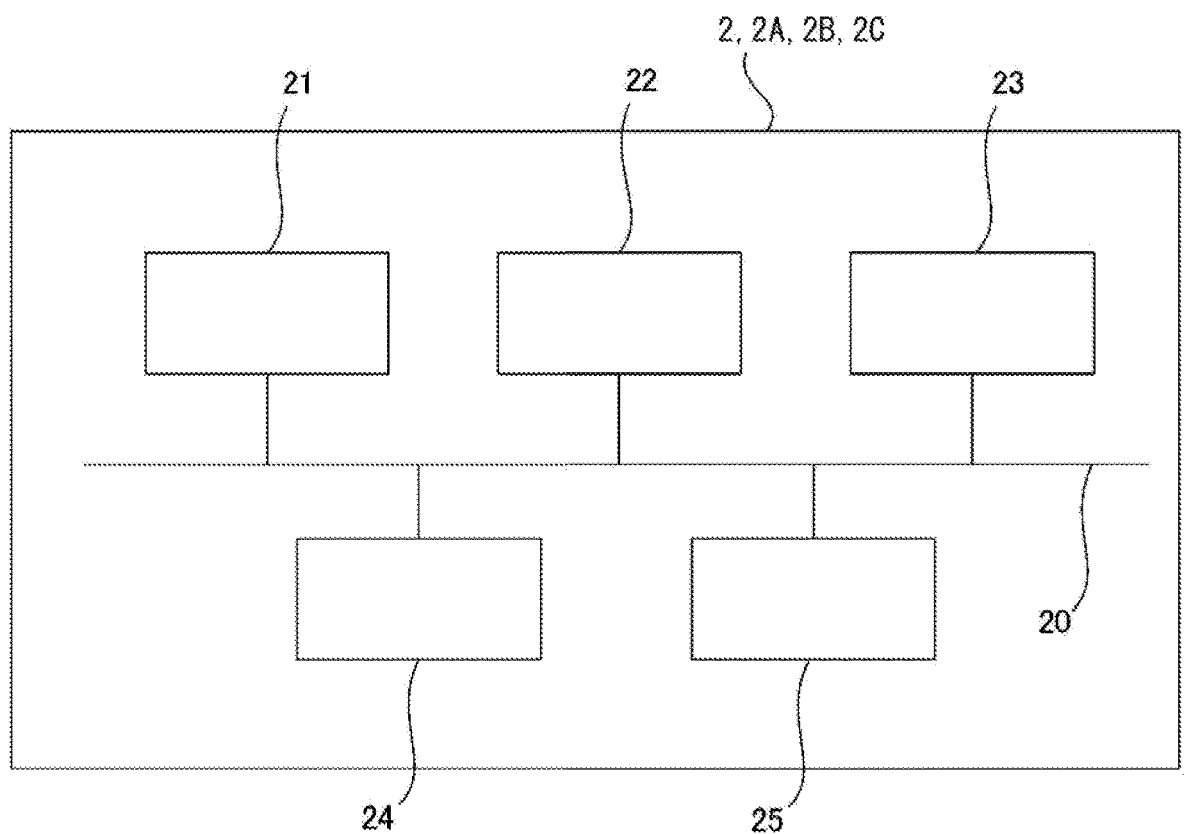
FIG. 2 is a diagram that illustrates a hardware configuration of an electronic control unit (ECU).

As illustrated in FIG. 2, each of the ECUs 2 may include, for example, a processor 21, a memory 22, a storage 23, input and output interfaces 24, and a communication interface 25 as hardware. The hardware is coupled to a bus 20.

The processor 21 may include, for example, a CPU (Central Processing Unit). The processor 21 is configured to control operation of the ECUs 2. The memory 22 may include, for example, a ROM (Read Only Memory) as a non-volatile memory, and a RAM (Random Access Memory) as a volatile memory. The memory 22 holds volatilely or non-volatilely various pieces of data such as programs to be executed by the processor 21, and provides a work area for the processor 21 to execute the programs.

The storage 23 may include, for example, an HDD (Hard Disk Drive) or an SSD (Solid State Drive). The storage 23 is configured to hold various pieces of data non-volatilely. The input and output interfaces 24 control data inputs to the ECUs 2 and data outputs from the ECUs 2. The communication interface 25 is configured to allow the ECUs 2 to communicate with other devices through a network such as the in-vehicle network L or the external network N mentioned above.

Figure 3:
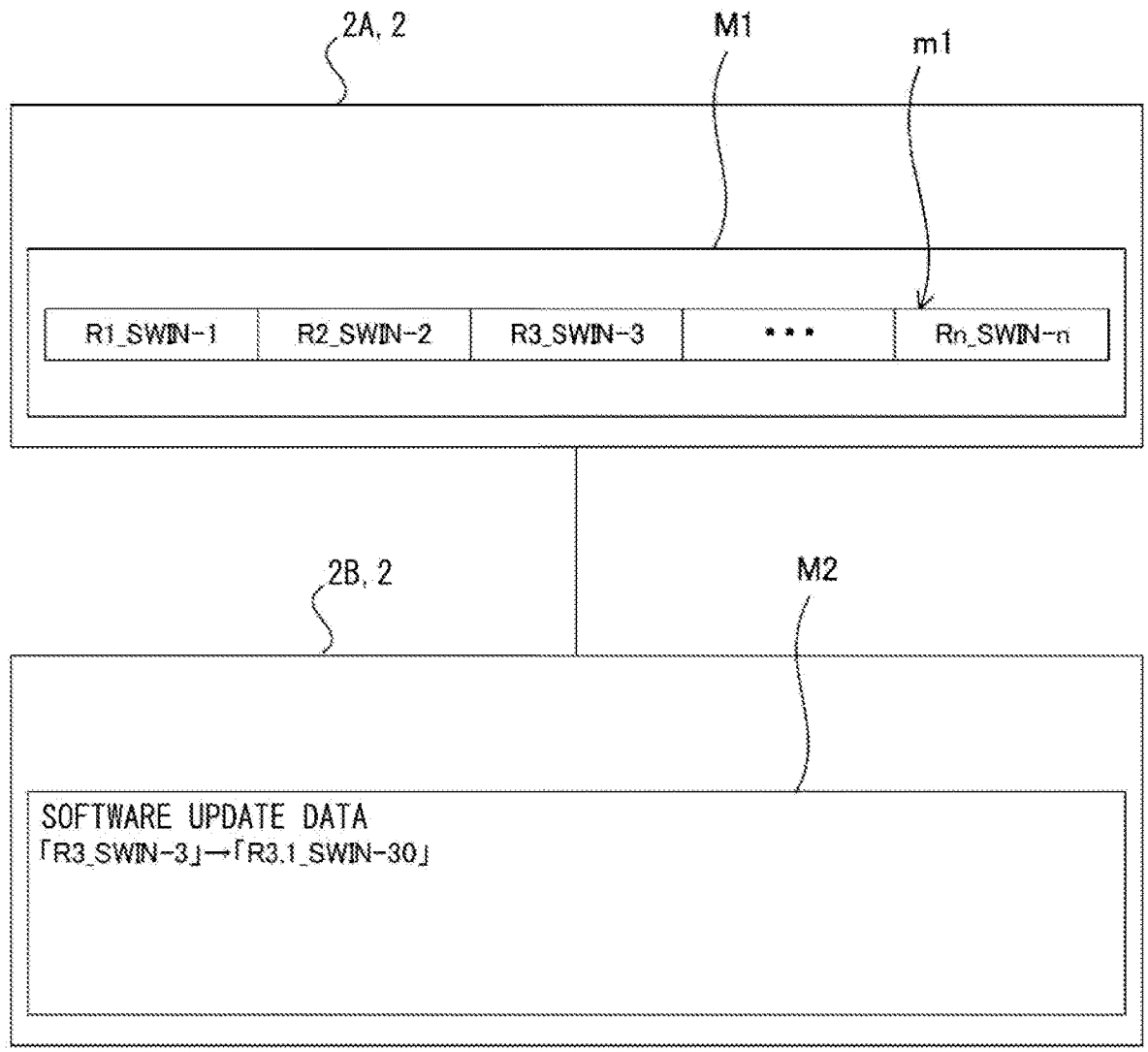
FIG. 3 is a diagram that illustrates basic operation of the management data rewrite system.

Description is given, with reference to FIGS. 3 to 6, of basic operation of the management data rewrite system 1. As illustrated in FIG. 3, management data m1 is held in a data storage M1 of the first ECU 2A (ECU 2). The management data m1 is data regarding the ECUs 2 mounted on the vehicle 100. An example of the management data m1 is RXSWIN management data mentioned above. The RXSWIN management data is held as a data string of data related to the ECUs 2 in the order of legal numbers R1, R2, R3, . . . , and Rn. The data storage M1 may include a non-volatile memory. The data storage M1 may include the ROM in the memory 22 mentioned above, or alternatively, the data storage M1 may include a portion of the storage 23.

As illustrated in FIG. 3, software update data is held in a data storage M2 of the second ECU 2B (ECU 2). The software update data is created on the occasion of an update of the in-vehicle software of the second ECU 2B (ECU 2) by an OTA (Over The Air) update. Here, the software update data is data related to legal regulations of the updated software. In the example illustrated in the figure, data is held that indicates that pre-update "R3_SWIN-3" has been changed to post-update "R3.1_SWIN-30". The data storage M2 may include a volatile memory. The data storage M2 may include, for example, the RAM in the memory 22 mentioned above.

Figure 4:
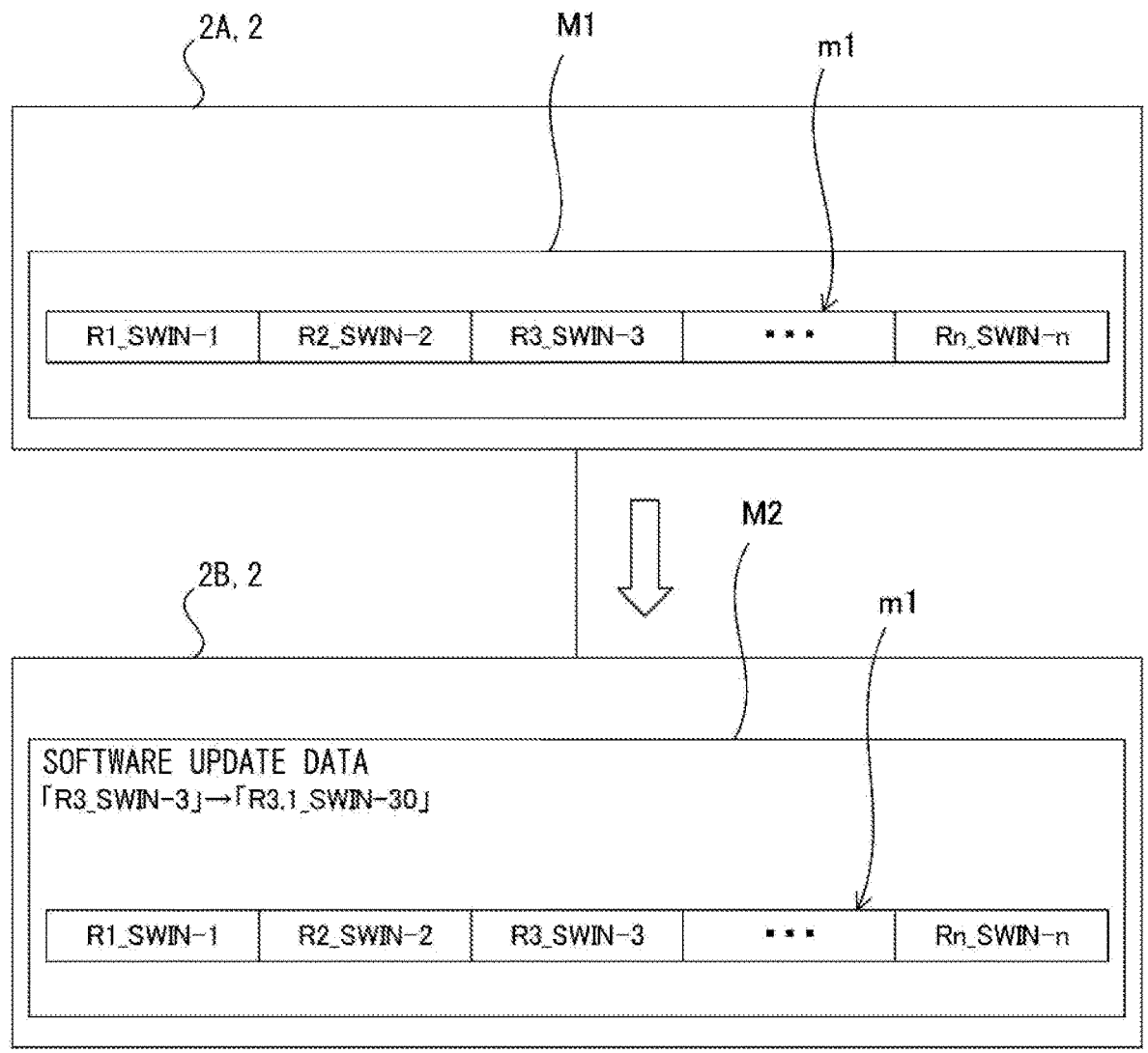
FIG. 4 is a diagram that illustrates the basic operation of the management data rewrite system.

In the management data rewrite system 1, as illustrated in FIG. 4, the second ECU 2B in which the update of the in-vehicle software is made receives an entirety of the management data m1 from the data storage M1 of the first ECU 2A in which the management data m1 is held. The second ECU 2B stores the entirety of the management data m1 in its own data storage M2.

Figure 5:
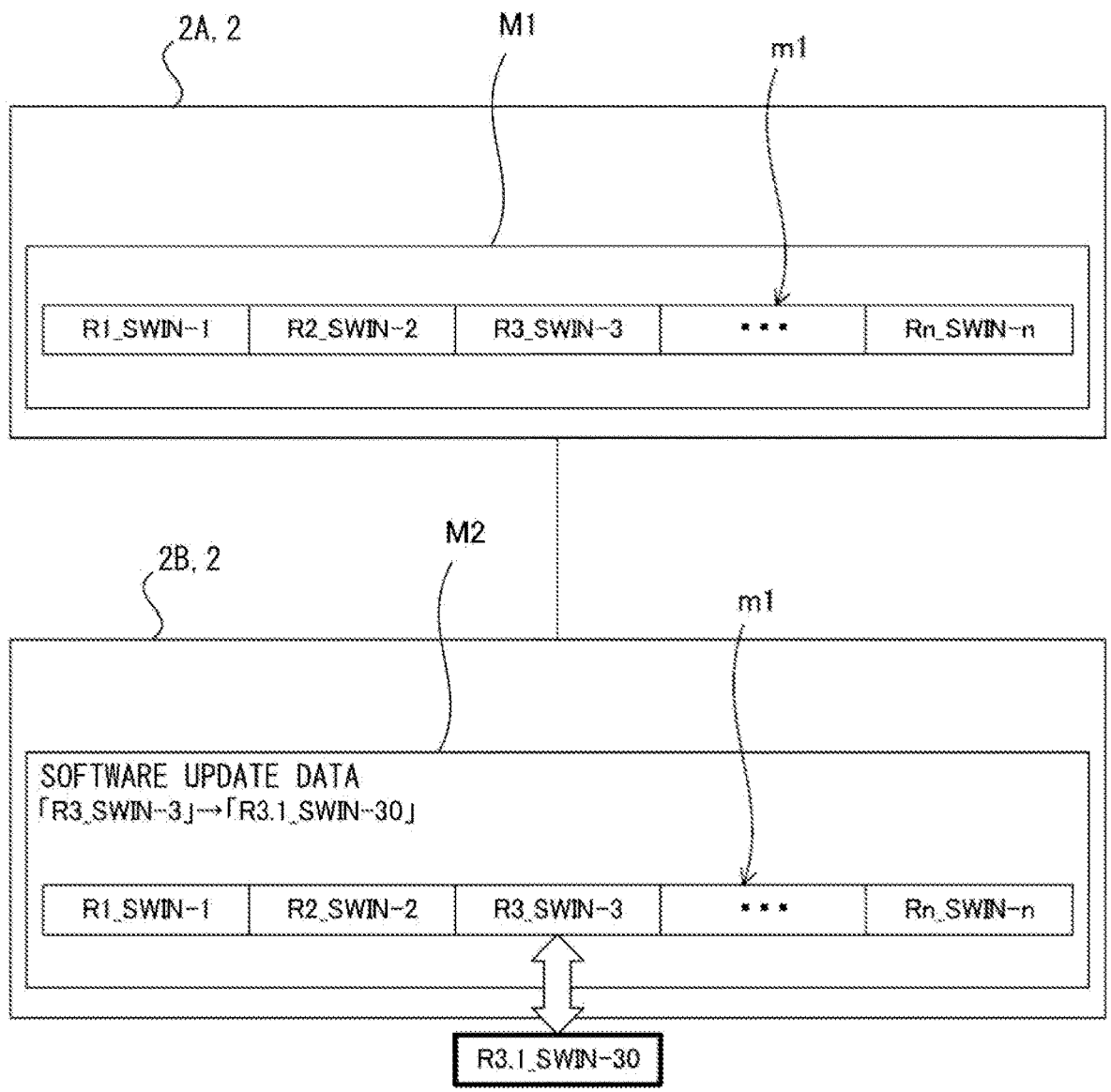
FIG. 5 is a diagram that illustrates the basic operation of the management data rewrite system.

As illustrated in FIG. 5, the second ECU 2B extracts a data portion related to the update of the software to be rewritten, from the entirety of the management data m1, with the use of the pre-update data "R3_SWIN-3" in the software update data held in the data storage M2. The second ECU 2B rewrites the data portion into the post-update data "R3.1_SWIN-30".

Figure 6:
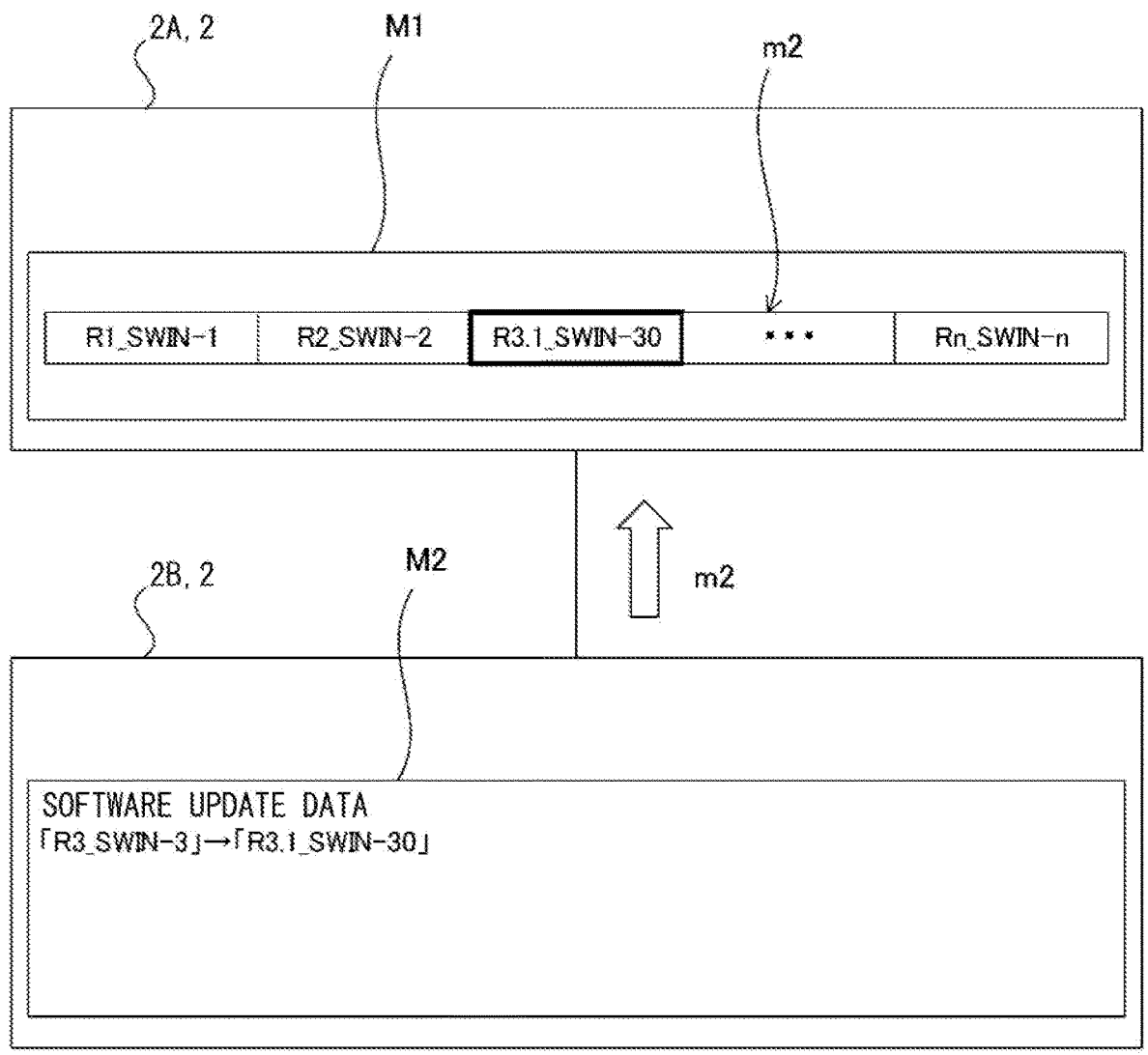
FIG. 6 is a diagram that illustrates the basic operation of the management data rewrite system.

At the end of the rewrite, as illustrated in FIG. 6, the second ECU 2B transmits the post-rewrite management data m2 held in the data storage M2, to the first ECU 2A. The first ECU 2A stores the post-rewrite management data m2 received, in the data storage M1. After the rewrite, the post-rewrite management data m2 held in the data storage M2 is erased at appropriate timing.

Figure 7:
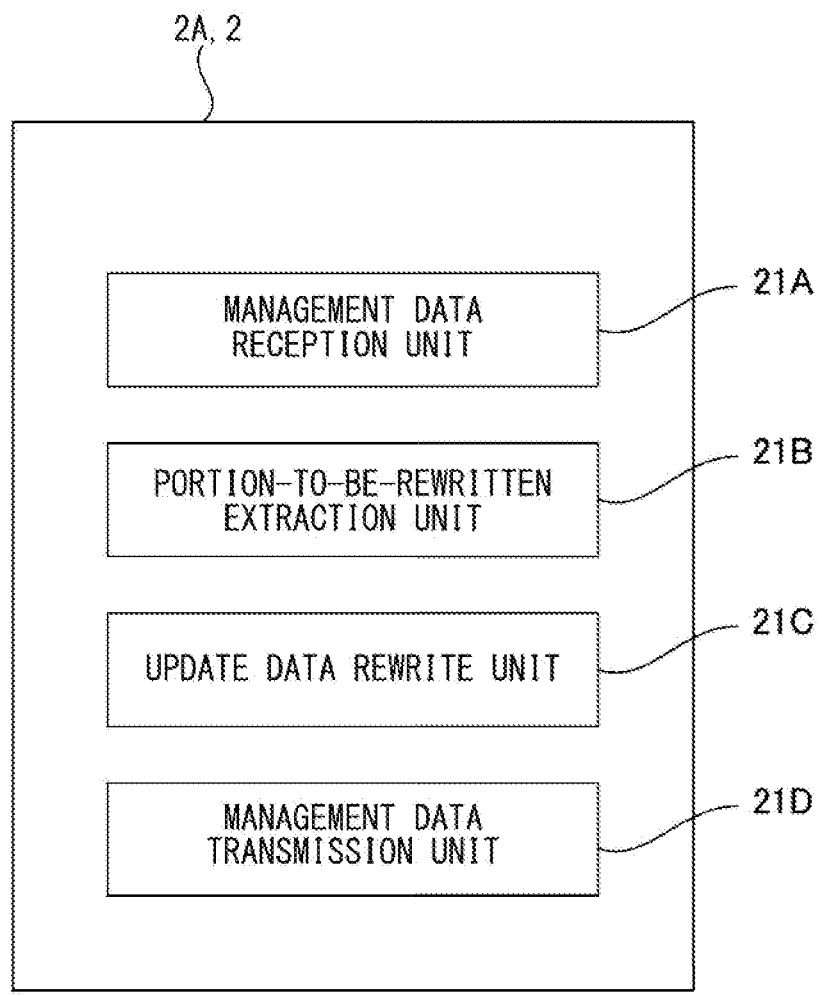
FIG. 7 is a diagram that illustrates a configuration of a second ECU in the management data rewrite system.

To perform the operation described above, a program is held in the ROM of the memory 22 of the second ECU 2B (ECU 2). The program causes the processor 21 to serve as a processor as follows. As illustrated in FIG. 7, a management data reception unit 21A, as a first unit, receives the entirety of the management data m1 held in the data storage M1 of the first ECU 2A. A portion-to-be-rewritten extraction unit 21B, as a second unit, extracts the data portion related to the update of the in-vehicle software, from the entirety of the management data m1 received. An update data rewrite unit 21C, as a third unit, rewrites the data portion extracted by the portion-to-be-rewritten extraction unit 21B, into new data in accompaniment with the update of the in-vehicle software. A management data transmission unit 21D, as a fourth unit, transmits an entirety of the post-rewrite management data m2 held in its own data storage M2, to the first ECU 2A (ECU 2).

Figure 8:
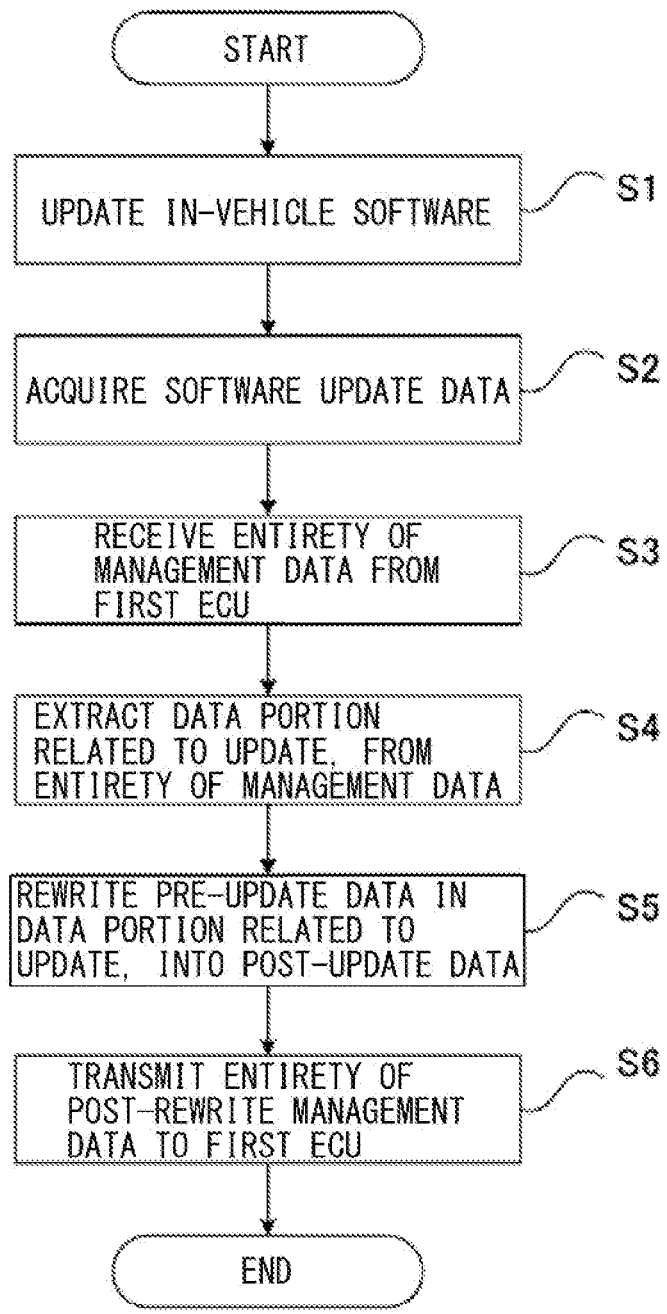
FIG. 8 is a flowchart of a processing flow by the second ECU in the management data rewrite system.

FIG. 8 is a flowchart of a processing flow by the second ECU 2B (ECU 2) according to the management data rewrite system 1. For example, the second ECU 2B (ECU 2) that serves as the DCM updates the in-vehicle software by the OTA update (step S1). Thereupon, the second ECU 2B (ECU 2) acquires the software update data as well (step S2). Thus, the second ECU 2B (ECU 2) receives the entirety of the management data m1 from the first ECU 2A (ECU 2) to rewrite the management data m1 (step S3).

Upon receiving the management data m1 from the first ECU 2A (ECU 2), the second ECU 2B (ECU 2) stores the management data m1 in its own data storage M2, and extracts the data portion related to the update, from the entirety of the management data m1, with the use of the software update data acquired (step S4). At this occasion, the second ECU 2B searches the data string of the management data m1 for target data, with the use of the pre-update data in the software update data.

The second ECU 2B (ECU 2) extracts the data portion related to the update, from the entirety of the management data m1, and rewrites the pre-update data into the post-update data, with the use of the post-update data in the software update data (step S5). Thus, the second ECU 2B transmits the entirety of the post-rewrite management data m2, to the first ECU 2A (ECU 2) (step S6), and ends the processing. Thereafter, in the first ECU 2A (ECU 2), the post-rewrite management data m2 transmitted is held in the data storage M1.

In such a management data rewrite system 1, the first ECU 2A (ECU 2), e.g., the CGW, performs solely the processing of simply transmitting the entirety of the management data m1 held, to the second ECU 2B (ECU 2). This saves the first ECU 2A from processing of receiving the software update data from the second ECU 2B (ECU 2), or extracting the data portion related to the update with the use of the update data received. Hence, it is possible to reduce a processing load on the first ECU 2A (ECU 2). Moreover, in a case where the first ECU 2A (ECU 2) is a gateway unit, it is possible to perform processing dedicated to relay processing between the individual LANs.

Meanwhile, the second ECU 2B (ECU 2) acquires the software update data by the update of its own in-vehicle software. With the use of the software update data, the second ECU 2B (ECU 2) is able to easily recognize which data portion of the management data m1 to rewrite into the new data in accompaniment with the update of the in-vehicle software. Hence, it is possible to smoothly rewrite the management data m1 by simple processing. In the management data rewrite system 1 of one embodiment of the disclosure, on the occasion of the OTA update, the entirety of the pre-rewrite management data m1 is transmitted to the ECU in which the in-vehicle software is updated, i.e., the second ECU 2B. Hence, it is possible to smoothly rewrite the management data m1.

According to one embodiment of the disclosure, in carrying out rewrite processing of management data related to multiple electronic control units in accompaniment with an update of in-vehicle software, it is possible to reduce a processing load on a first electronic control unit that holds the management data, leading to a smooth rewrite of a data portion related to the update.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

Moreover, the foregoing embodiments may be applied to each other and combined together insofar as they are not contradictory to each other in terms of their purposes and configurations.

The ECUs 2 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the ECUs 2. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the ECUs 2 illustrated in FIG. 2.

The invention claimed is:

1. A management data rewrite system comprising:
   a first electronic control unit including a non-volatile memory, the non-volatile memory being configured to hold management data regarding multiple electronic control units; and
   a second electronic control unit in which an update of in-vehicle software is made, the second electronic control unit being coupled to the first electronic control unit and configured to carry out transmission and reception of data to and from the first electronic control unit through an in-vehicle network,
   the management data rewrite system being configured to rewrite the management data on an occasion of the update of the in-vehicle software, and the second electronic control unit being configured to
receive an entirety of the management data from the non-volatile memory of the first electronic control unit,
rewrite a data portion related to the update of the in-vehicle software in the management data, into new data, and
transmit an entirety of the management data containing the rewritten data portion to the first electronic control unit, to allow the non-volatile memory to hold the entirety of the management data containing the rewritten data portion.

2. The management data rewrite system according to claim 1, wherein
the second electronic control unit comprises a data communication module configured to establish wireless communication with an external network.

3. The management data rewrite system according to claim 2, wherein
the second electronic control unit is configured to
hold update data regarding the in-vehicle software, and
extract the data portion related to the update of the in-vehicle software from the management data on a basis of the update data.

4. A vehicle comprising the management data rewrite system according to claim 3.

5. A vehicle comprising the management data rewrite system according to claim 2.

6. The management data rewrite system according to claim 1, wherein
the first electronic control unit comprises a gateway unit configured to be coupled to the multiple electronic control units through the in-vehicle network.

7. The management data rewrite system according to claim 6, wherein
the second electronic control unit is configured to
hold update data regarding the in-vehicle software, and
extract the data portion related to the update of the in-vehicle software from the management data on a basis of the update data.

8. A vehicle comprising the management data rewrite system according to claim 7.

9. A vehicle comprising the management data rewrite system according to claim 6.

10. The management data rewrite system according to claim 1, wherein
the second electronic control unit is configured to
hold update data regarding the in-vehicle software, and
extract the data portion related to the update of the in-vehicle software from the management data on a basis of the update data.

11. A vehicle comprising the management data rewrite system according to claim 10.

12. A vehicle comprising the management data rewrite system according to claim 1.

13. A vehicle comprising a management data rewrite system, the management data rewrite system comprising:
a first electronic control unit including a non-volatile memory, the non-volatile memory being configured to hold management data regarding multiple electronic control units; and
a second electronic control unit in which an update of in-vehicle software is made, the second electronic control unit being coupled to the first electronic control unit and configured to carry out transmission and reception of data to and from the first electronic control unit through an in-vehicle network,
the management data rewrite system being configured to rewrite the management data on an occasion of the update of the in-vehicle software, and
the second electronic control unit being configured to
receive an entirety of the management data from the non-volatile memory of the first electronic control unit,
rewrite a data portion related to the update of the in-vehicle software in the management data, into new data, and
transmit an entirety of the management data containing the rewritten data portion to the first electronic control unit, to allow the non-volatile memory to hold the entirety of the management data containing the rewritten data portion.

* * * * *